(No Model.) 3 Sheets—Sheet 1.

J. J. SMITH.
GIN SAW SHARPENING AND GUMMING MACHINE.

No. 596,462. Patented Dec. 28, 1897.

WITNESSES
T. B. Ford
H. L. Keith

INVENTOR
John J. Smith
By Attorneys
A. A. Woodson (No Model.) 3 Sheets—Sheet 2.
J. J. SMITH.
GIN SAW SHARPENING AND GUMMING MACHINE.

No. 596,462. Patented Dec. 28, 1897.

WITNESSES
G. B. Ford
H. L. Keith

INVENTOR
John J. Smith,
by ATTORNEYS
A. A. Woods & Son

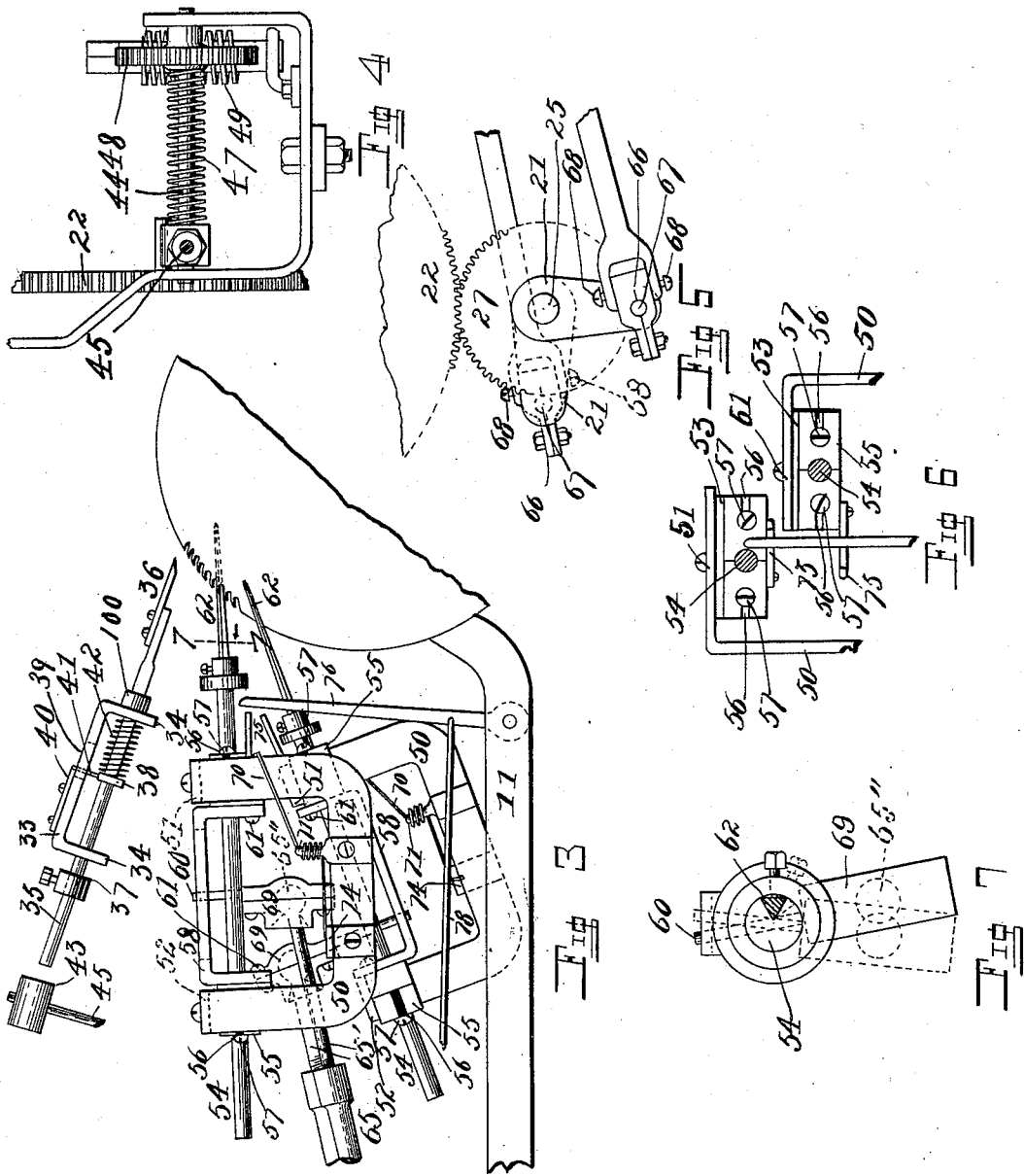

UNITED STATES PATENT OFFICE.

JOHN JACKSON SMITH, OF McDONOUGH, GEORGIA, ASSIGNOR OF ONE-HALF TO PAUL TURNER, OF SAME PLACE.

GIN-SAW SHARPENING AND GUMMING MACHINE.

SPECIFICATION forming part of Letters Patent No. 596,462, dated December 28, 1897.

Application filed September 14, 1895. Serial No. 562,548. (No model.)

*To all whom it may concern:*

Be it known that I, JOHN JACKSON SMITH, a citizen of the United States of America, and a resident of McDonough, in the county of Henry and State of Georgia, have made a certain new and useful Improvement in Gin-Saw Sharpening and Gumming Machines; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

Figure 1:
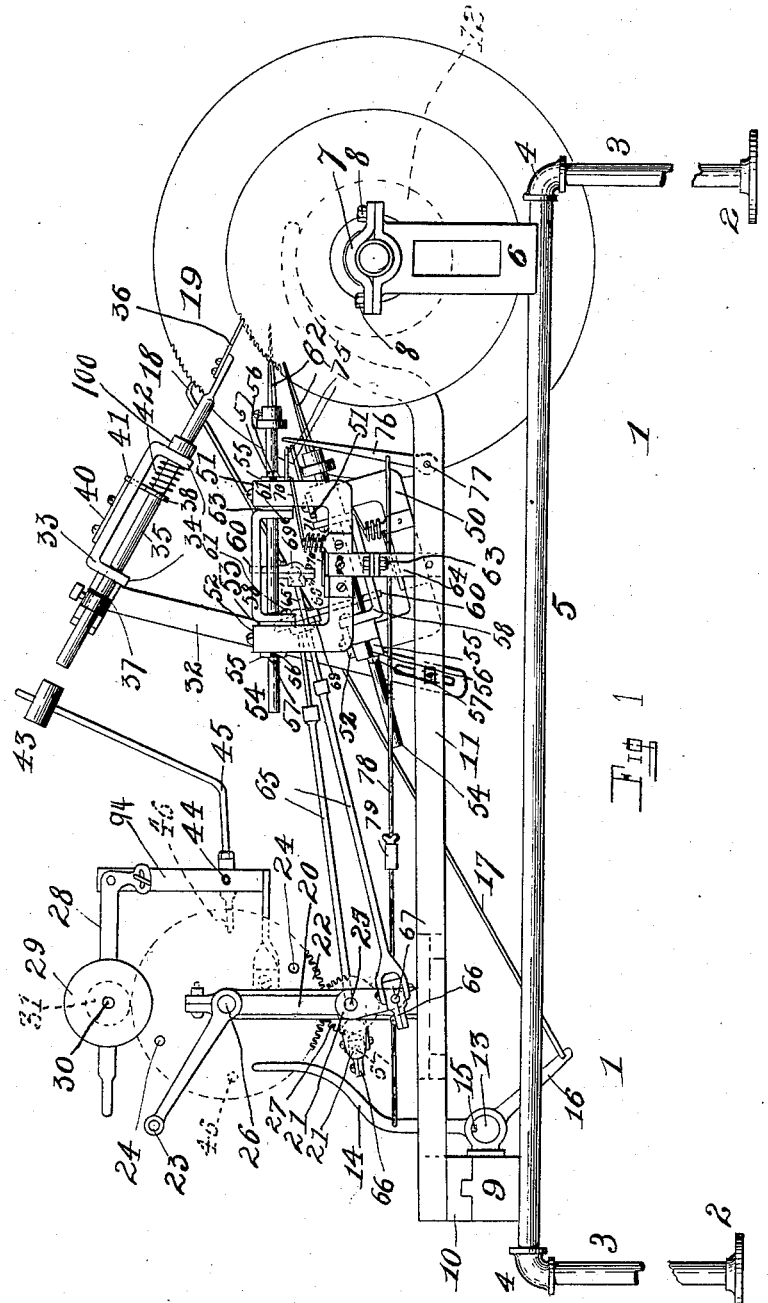
Figure 2:
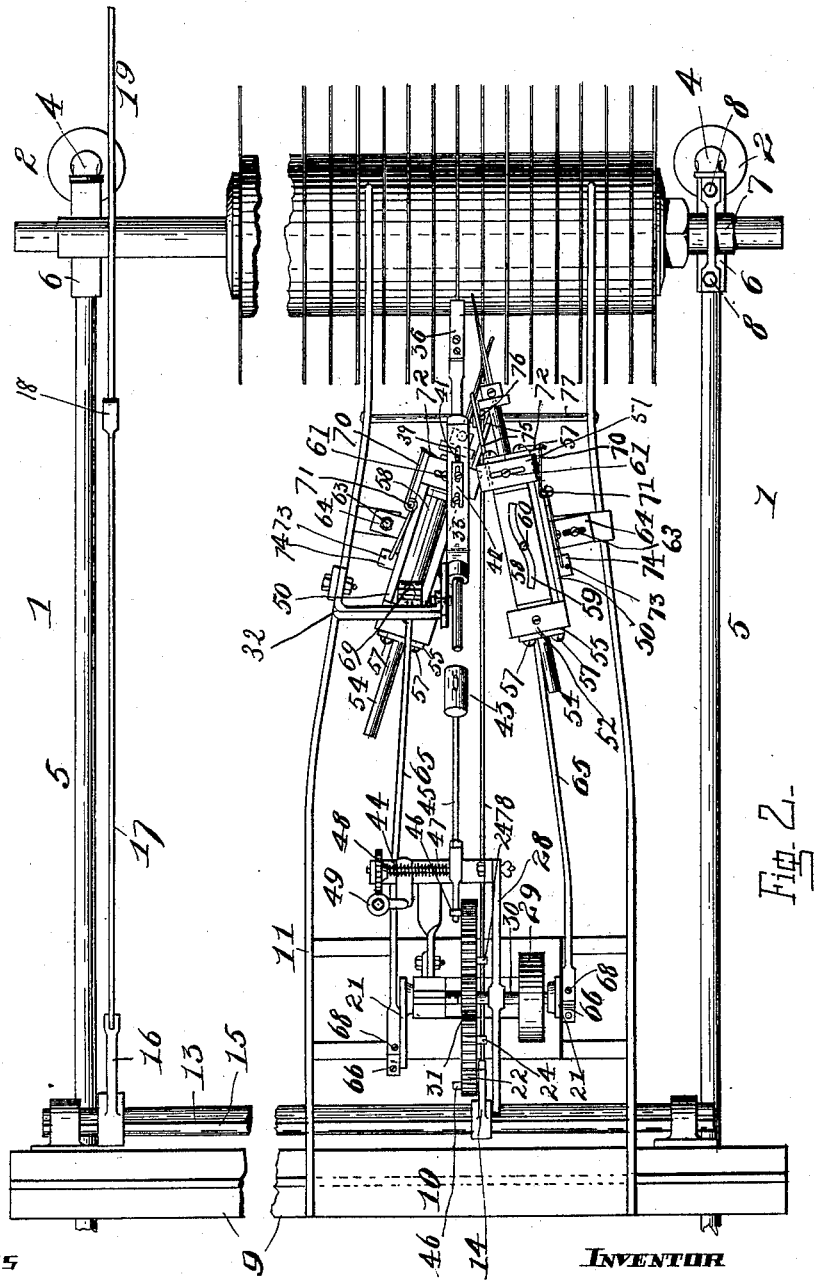

In the accompanying drawings, Figure 1 is a side elevation of the device, showing same in position on a cylinder of saws. Fig. 2 is a plan thereof. Fig. 3 is an enlarged detail of the forward end of the machine in side elevation. Fig. 4 shows the adjustable striker for the gummer-hammer. Fig. 5 is a detail of the actuating crank, pitman, and gearing. Fig. 6 is a front elevation of the file-rod arms, showing the inclined arms and the vibratory finger for causing a divergence of the points thereof. Fig. 7 is a section on the line 7 7, Fig. 3.

In the figures like reference-marks are uniformly employed in the designation of corresponding elements of construction.

1 is a framework forming a base, which is made in the construction shown, the same being its preferable form, of pipe and fittings screwed together and having flange-fittings 2, forming a base for the uprights 3, the transverse bars or pipes 5 being secured at their ends to said uprights 3 by means of L's 4 or other suitable angle-fittings. On the back ends of the cross-pieces 5 are pillow-blocks 6, in which are temporarily journaled the bearings of the shaft of the saw-cylinder in process of being sharpened and gummed, said cylinder being caused to move by certain feed mechanism, hereinafter specified, and prevented from being moved too far by the momentum due to its sudden feeding forward by a strap 7, which is placed over the shaft thereof and tightened to the desired degree by means of the set-screws 8. A quick-moving feed is very advantageous, and it is obviously necessary that the saw should move a distance equal to the pitch of the tooth to be filed next and not more. A transversely-extending supporting-bar 9 is secured to the other ends of the cross-bars 5 and is preferably provided with a rib along its upper side, whereon rests the base 10 of the machine proper, arms 11, secured to the ends of said base and a sufficient distance apart thereon, extending to the space-blocks 12 of the saw-cylinder, said bars 11 being straight and horizontally disposed for most of their length, their free forward ends being curved to lie upon or fit over the aforesaid space-blocks, as shown in Fig. 1. If it is thought best to cause such an engagement between the space-blocks and the bars 11 as to prevent the recession of the machine from the saws thereby, the ends of the arms 11 may be curved and extended beyond the limit shown in Fig. 1, and so in a manner partially encircle and grasp the said space-blocks. In the present instance, however, the position of the machine relative to the saws is preserved by the engagement of the base 10 by its groove with the rib on the cross-bar 9. To these bars 11 are secured, in one way and another, all of the braces and uprights supporting the operative parts of the machine, and it is hence obvious that these bars are simply required to be of such shape as will sustain the working parts and rest upon the saw-cylinder, and for this reason I do not confine myself in any manner to the construction of said bars 11 shown and described.

The feed mechanism consists of the rock-shaft 13, so journaled on the bar 9 as to be partially rotatable in its bearings, and should be of sufficient length to lie at all times under the machine as it traverses the cylinder from end to end. A groove 15 is cut in the periphery of this shaft and forms a spline, an arm 14 being mounted on said shaft so as to have motion laterally thereon, and being provided with a tongue entering the groove 15 the vibratory motion of said arm is transmitted to said shaft, the said arm, being curved and extended upwardly, receiving a vibratory motion from contact with the pins set in the wheel to be hereinafter described. Lateral movement is provided for on said shaft in order that the said arm may follow the machine as it is moved from a finished saw to the next one to be operated upon. On one end of the shaft 13 is an oppositely-projecting arm 16, and a pitman 17, carrying a pawl 18 on its end, is connected to the end of said arm 16, the pawl 18 engaging the teeth of the ratchet-wheel 19 as it is moved in one direction, said dentated ratchet-wheel being mounted on the shaft of the saw-cylinder so as to be easily removable therefrom. This ratchet-wheel should be provided with at least as many teeth as there are on the saw to be sharpened, and when just that number are employed the pawl should recede a sufficient distance to catch just one thereof. In this case it would be necessary to have one feeding-wheel for each pitch of saw to be filed. In order to dispense with the necessity of having so many of these feeding-wheels, it might be provided with teeth of sufficient fineness to provide for a considerable latitude of adjustment of the feeding mechanism, so that the saw-cylinder may be revolved a distance proper for any pitch of tooth.

Carried on uprights 20, secured to the bars 11, is the main shaft 26, carrying a spur-gear 22 between said uprights and having a hand-crank 23 on its end for manual revolution thereof. Pins 24 on the side of said spur-gear strike the upper end of the arm 14 as many times in each revolution thereof as there are pins in the wheel and actuate the feeding device hereinbefore described. The said arm projects as near as convenient radially across the circular line of movement of said pins in order that the action of the feed may be quick and the saw-cylinder be moved practically instantaneously, one tooth at a time, in order that there may be more time for the machine to work and make its changes from tooth to tooth.

Below the shaft 26 is a shaft 25, which has on its end cranks 21, preferably turned in opposite directions, although, if desired, they may be set quartering or otherwise. As the reciprocable file-rods are actuated by these cranks, it appears preferable that the cranks should project in opposite directions, inasmuch as one file will then be moved backwardly while the other is moved forwardly, and the operation of the machine be therefore more equable. A pinion 27 on the shaft 25 meshes with the spur-gear 22 and is so proportioned that it will make about two revolutions to each operation of the feeding mechanism, thus giving two forward strokes of each file on each tooth as it is brought into proper position.

28 is an arm so set as to be held in a depressed or elevated position, and carries a pulley 29 of a shaft 30, the other end of which shaft bears the pinion 31, meshing with the spur-gear 22, when the lever 28 is depressed. To this pulley 29 may be attached a belt from a suitable line or counter-shaft, and by this means the machine may be actuated by power instead of manually.

Projecting upwardly from the bar 11 (left, as shown) is an upright 32. Slotted at its lower end and carried on the upper end thereof is a head 33, also slotted and provided with two downwardly-projecting lugs 34, which are concentrically perforated, and a rod 35 is set therein so as to have movement longitudinally. The forward lug 34 has a collar 100 projecting from the same. This collar, together with the said lug, forms a bearing for the forward end of the rod 35. This rod carries on its distal extremity a blade 36, which is sharpened on its working end to fit between the teeth, its edge being thus blunted to shape the gum of the tooth by upsetting the small fin or sharp edge left therein by the operation of filing the teeth to a point. This also deepens the interdental spaces to correspond with the shortening of the teeth by wear. This blade should be removable, so that it may be readily removed when worn. A collar 37 is secured on the rod, so as to limit its forward movement, and another collar 38 is set thereon between the lugs 34, and the pin 41 thereon projects upwardly through the slot 39 in the head 33, a stop-plate 40 being adjustably secured to the upper side of said head in such a position that on the retraction of the rod after a blow the pin 41 will contact with said plate and stop the retraction of the rod. A spring 42, seated on said rod between the collar 38 and the lower lug 34, serves to retract the rod after a blow. The lower end of the upright 32 is slotted, and by means of this slot adjustment of the blade 36 relative to the tooth is had, so that the end of the blade will conform to the position of the interdental space when it is driven into same. This blade is driven into the interdental spaces by means of a hammer 43, which is caused to strike the back end of the rod 35 by means of the following-described mechanism: Journaled on the pin 44, mounted upon the support 94, (left in the construction shown,) is a lever 45, which carries on its upper end the aforesaid hammer 43, its lower end being extended to the side of the spur-gear 22, where pins 46, set in the side of said gear, will contact with the upper side thereof as the gear revolves. This serves to retract the lever 45 and its hammer-head 43, a spring 47 around the shaft or pin 44, and connected at one end to the lever 45 and at its other end with the worm-gear 48, set loosely on said pin 44, serving to swing same against the back end of the rod 35. The tension of the spring 47 is adjusted by means of the worm-gear 48 and its companion worm 49, which latter is suitably journaled in mesh with said worm-gear and provided with a squared head or other means for turning it.

50 are U-shaped shackles having their upper ends turned inwardly, as shown in Fig. 6, and slotted, as shown in Fig. 2, in the inwardly-turned end 51, while a hole for a pivoting-screw is made in each of the other ends, (marked 52 in the drawings.) Bolted by screws passing, respectively, through the slots in the ends 51 and the holes in the ends 52 are angle-plates 53, one under each of the said inwardly-turned ends, said plates being notched for the passage of the file-rods 54 and having on one side (the concaved side of the angle) bearing-boxes 55, adjustably secured thereto. The adjustment is provided for by slots 56 in said bearing-boxes, through which pass the screws 57, serving to secure the bearing-boxes to the angle-plates. As these bearing-boxes are worn by use they are moved inwardly. As aforesaid, the back angle-plates 53 are pivotally secured to the arms 52 and the front ones are secured to the ends 51 in such a manner as to have lateral movement thereon, and a yoke 58 connects these angle-plates in pairs on each of the U-shaped shackles 50. Each yoke 58 has bearings in its ends in the same line as the bearings of the boxes carried by the shackle. Through the bearings of the yoke and of the said boxes a file-rod passes and reciprocates therein. The yoke is attached to the shackle by the pins 61, passing through the ends of the same into the angle-plates. The yoke has a slight movement relatively to the shackle, which is allowed for by the slots through which the pins 61 pass into the angle-plates. A slot 59 in the shape of a modified sigmoidal curve is formed in the yoke. The sides of the slot are radial with the axis of the file-rod. On the latter a pin 60 is mounted and registers with the said slot. As the file-rod is reciprocated the pin follows the curve of the slot in the yoke. As the yoke is substantially fast to the shackle, the file-rod is caused to be slightly rotated or rocked on its axis by reason of the pin moving in the slot. As the sides of the slot are radial with the axis of the file-rod and the pin also being radial to the axis of rod, the pin will move freely in the slot. Any slight tendency that the pin might have to bind is prevented by the slight movement that the yoke has relatively to the shackle. This movement of the file-rod turns the file 62, so as to present different portions of the latter to the saw that is being sharpened. As shown in Fig. 2, both of the shackles 50 are adjustable, having a partially-rotary movement with the screws 63, joining the two halves of the bracket 64, by which they are secured to the bars 11. Inasmuch as the saws of gins for delinting or reginning cotton-seed are closer together than those of the common gin it is necessary to make the angle of the files more acute relatively to each other to file them. Otherwise the points of the files at the extreme forward end of their strokes will contact with the sides of the saws next the saw being filed. It is customary in saw-filing machines to shorten the stroke in such cases; but by means of the lateral adjustment of one or both of the shackles and their pivotal adjustment I am enabled to bring the file-rods closer together at their back ends, whereby the files will be made to run at an angle to the saw more acute than otherwise. Of course the longer the stroke of the file the faster the work of the file is accomplished, and hence the advantage of this adjustment over shortening the stroke of the files in filing "linter" gins.

The file-rods are reciprocated by pitmen 65, connected with the wrist-pins 67 of the cranks 21 through split bearing-boxes 66, held between the bifurcated ends of the pitmen upon screws 68, passing through the ends of said pitmen, whereby a gimbal-joint is provided to allow of the several necessary adjustments of the file-rods relative to the saw. The pitmen 65 are composed of the main rods and small resilient rods 65', which carry the spherical heads 65", forming one member of the universal joints, the same further consisting of the hollow boxes 69, secured to the file-rods. These boxes 69 consist of two halves connected on their inner sides, one of which in the construction shown is integral with the pin 60, hereinbefore described, and the other forming a cap inclosing the spherical head of the rod 65'. This universal joint, as well as the gimbal-joint in the other ends of the pitmen, is necessary, inasmuch as the line of movement of the file-rod is not in the plane of movement of the cranks, but is at an angle thereto, and the adjustments of each file-rod to suit the particular make of saws to be sharpened varies this angle considerably.

In order that the files shall be lifted out of each tooth after it is completed and not be dragged over the somewhat slender and delicate points of said teeth, I have provided for lateral motion of the bearing-boxes 55 nearest the files hereinbefore described, and I will now proceed to describe the means whereby the files are pressed against the saws while they are being filed and the means for lifting the files from their contact as the saw is moved to bring the next tooth into position to be filed. Springs 70, supported upon the pins 71, secured to the shackles 50, are connected at their forward ends to the forward boxes 55 by means of a chain or rod 72, their back ends being extended and having a down-turned portion entering holes 73, of which a series of the proper number are punched in the plates 74, secured to the shackles, as shown in Figs. 2 and 3. Secured to the forward boxes 55 are forwardly-projecting horns 75, which are crossed, as shown in Fig. 2, and between which works the vibratory finger 76, thereby causing a divergence of the forward ends of said horns and a movement of the forward bearing-boxes 55 toward each other. The files carried by the file-rods passing through said boxes 55 are crossed upon the edge of the saw when in contact therewith and will obviously be caused to diverge upon the divergence of the forward ends of the horns. This finger 76 is secured to a cross-bar 77, extending between the side bars 11 and rotatable therein, whereby said finger may be vibrated by means of a pitman 78, connected with the lever 14, as shown in Fig. 1, and having a turnbuckle 79 incorporated in it whereby the backward limit of movement of the said finger may be adjusted and the lift of the files varied.

The operation of this device is as follows: A partial revolution of the gear 22 brings one of the pins 24 into contact with the arm 14 and by a partial rotation of the shaft 13 causes a forward movement of the pitman 17 and the pawl 18 and revolves the saw-cylinder a distance equal to the interdental distance on the saw and at the same time lifts the files from the said saw, as hereinbefore described, the finger 76 diverging the horns 75, due to the movement of the arm 14 and the pitman 78, the recession of said arm and pitman allowing the finger 76 to vibrate backwardly and drop the files into the unfiled tooth just fed up into position. The files 62 are continually reciprocated, so that as soon as they touch the saw they commence work. The teeth are filed once around the saw, the knife 36 being driven against the sharp edges of the gum, after which another filing is had and the teeth on that saw are completed. The machine is then lifted off of that saw and set onto the next one, when the operation is repeated.

Having thus described my invention, what I claim as new, and desire to secure by Letters Patent of the United States, is—

1. In a gin-saw sharpening and gumming machine, the combination of a shaft, an arm carrying a hammer journaled on said shaft, a worm-gear loosely mounted on said shaft, a torsion-spring wound on said shaft and connected at one end with said arm and at the other end with said gear, and a means for turning said gear for varying the tension on said spring.

2. In a gin-saw sharpening and gumming machine, the combination of a shaft, an arm carrying a hammer journaled on said shaft, a worm-gear loosely mounted on said shaft, a torsion-spring wound on said shaft and connected at one end with said arm and at the other end with said gear, a worm meshing with said gear, and a means for turning said worm.

3. In a gin-saw sharpening and gumming machine, the combination of a support, a head carried by said support having two lugs projecting from the same and provided with a slot intermediate of said lugs, a chisel-carrying rod mounted in bearings formed in said lugs, means for driving said rod forward, a collar mounted on said rod to limit the forward movement of the same, a collar mounted on said rod intermediate of said lugs, a pin carried by said latter collar registering with the slot in said head, a retracting-spring operating on said rod, and a stop-plate adjustably mounted on said head to engage with said pin to regulate the distance that the said pin travels in said slot.

4. In a gin-saw sharpening and gumming machine, the combination of a support, a U-shaped shackle mounted on said support, a bearing-box pivoted to the end of one of the legs of said shackle, a bearing-box adjustably mounted on the end of the other leg of said shackle, a file-rod mounted in said bearing-boxes, means for reciprocating said file-rod, a horn mounted on said adjustable bearing-box, an operating-finger bearing on said horn, a yoke secured at its ends to said bearing-boxes and having a slot in the shape of a sigmoidal curve, and a pin carried by said file-rod and engaging with said slot.

In testimony whereof I hereunto affix my signature in presence of two witnesses.

JOHN JACKSON SMITH.

Witnesses:
PAUL TURNER,
J. W. MAXWELL.